United States Patent
McKenna et al.

(10) Patent No.: US 10,215,883 B2
(45) Date of Patent: Feb. 26, 2019

(54) METHODS AND SYSTEMS FOR MONITORING GROUNDWATER DISCHARGE

(71) Applicant: INTERNATIONAL BUSINESS MACHINES CORPORATION, Armonk, NY (US)

(72) Inventors: Sean A. McKenna, Dublin (IE); Seshu Tirupathi, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 40 days.

(21) Appl. No.: 15/397,084

(22) Filed: Jan. 3, 2017

(65) Prior Publication Data
US 2018/0188089 A1    Jul. 5, 2018

(51) Int. Cl.
*G01V 9/02*    (2006.01)
*G01F 1/704*    (2006.01)
*E21B 47/04*    (2012.01)

(52) U.S. Cl.
CPC ............. *G01V 9/02* (2013.01); *E21B 47/04* (2013.01)

(58) Field of Classification Search
CPC ............ G01F 1/704; G01F 25/00; G01V 9/02
See application file for complete search history.

(56) References Cited

U.S. PATENT DOCUMENTS

| | | |
|---|---|---|
| 9,228,853 B1 | 1/2016 | Brennan |
| 9,441,988 B2 | 9/2016 | Armon et al. |
| 2003/0078901 A1* | 4/2003 | Coppola, Jr. ............ G01V 9/02 706/21 |
| 2013/0332090 A1 | 12/2013 | Scolnicov et al. |

* cited by examiner

*Primary Examiner* — Toan Le
(74) *Attorney, Agent, or Firm* — Griffiths & Seaton PLLC

(57) ABSTRACT

Embodiments for monitoring groundwater discharge by one or more processors are described. A groundwater head at each of at least some of a plurality of locations is measured. A groundwater discharge for at least one of the plurality of locations is determined based on the measured groundwater heads. The determined groundwater discharge is compared to a groundwater discharge threshold associated with the at least one of the plurality of locations.

18 Claims, 8 Drawing Sheets

US 10,215,883 B2

METHODS AND SYSTEMS FOR MONITORING GROUNDWATER DISCHARGE

BACKGROUND OF THE INVENTION

Field of the Invention

The present invention relates in general to computing systems, and more particularly, to various embodiments for monitoring groundwater discharge.

Description of the Related Art

Approximately 0.8% of the total water on earth is in the form of fresh groundwater, which is largely responsible for meeting the needs of humans on a daily basis. As such, fresh groundwater is a highly constrained resource. Monitoring the usage of groundwater (and/or preventing groundwater over-discharge) is a critical challenge considering the ever-increasing demand for fresh water and how easily it may be accessed.

Some current monitoring systems, such as automatic meter reading (AMR) and advanced metering infrastructure (AMI) systems, are usually enabled by a mechanical device that is not connected to a real-time monitoring and analysis system. In some cities, embedded based water flow monitoring systems include microcontrollers that record the flow rate using a flow sensor to determine when the valve, controlled by a central processing station, is turned on and off. However, most current techniques for detecting water over-discharge are confined to water networks (e.g., physical infrastructure) and do not monitor groundwater.

SUMMARY OF THE INVENTION

Various embodiments for monitoring groundwater discharge by one or more processors are described. In one embodiment, by way of example only, a method for monitoring groundwater discharge, again by one or more processors, is provided. A groundwater head at each of at least some of a plurality of locations is measured. A groundwater discharge for at least one of the plurality of locations is determined based on the measured groundwater heads. The determined groundwater discharge is compared to a groundwater discharge threshold associated with the at least one of the plurality of locations.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
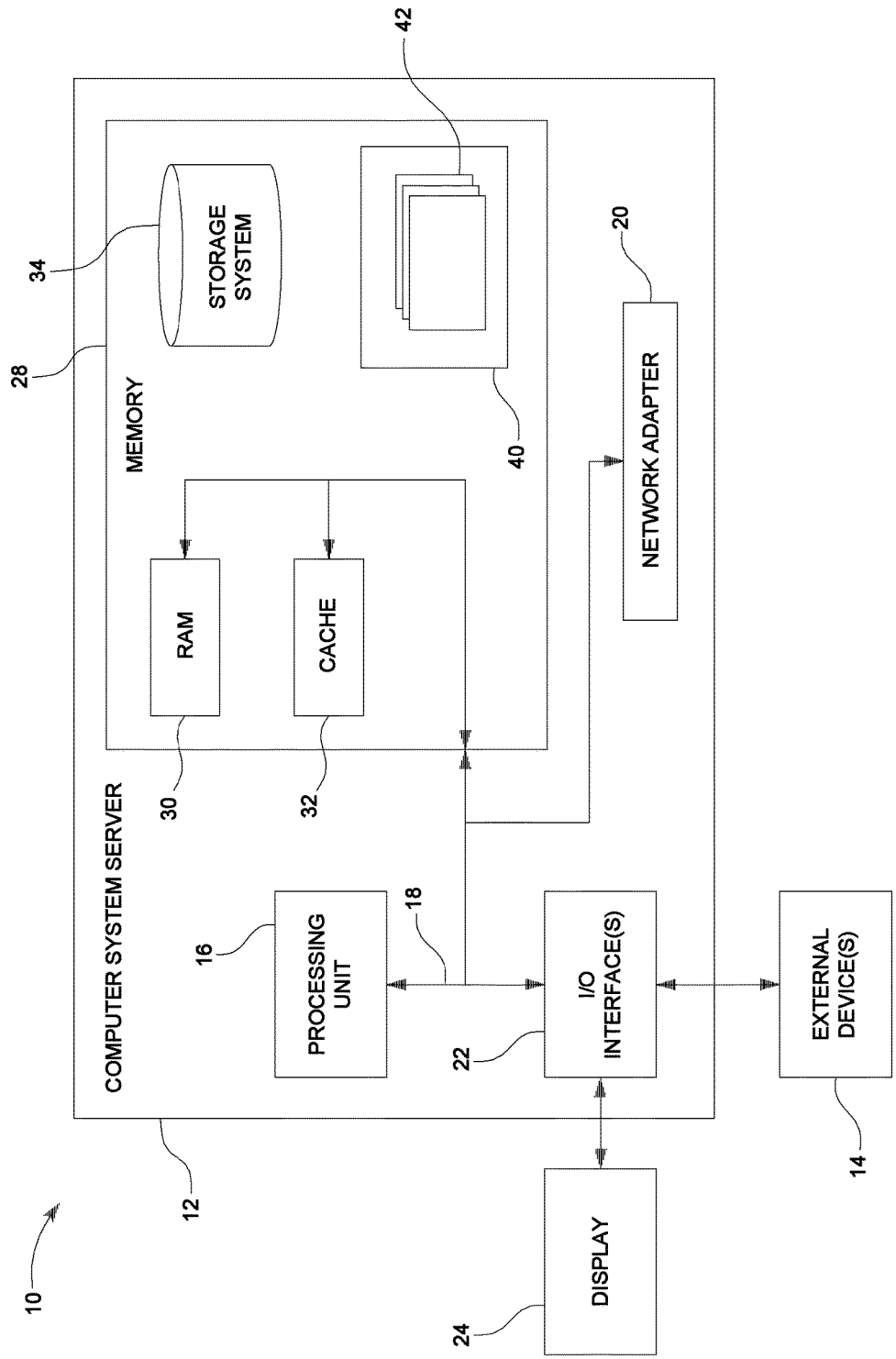
FIG. 1 is a block diagram depicting an exemplary computing node according to an embodiment of the present invention.

As previously indicated, most current techniques for detecting water over-discharge are confined to water networks and do not monitor groundwater, which provides a significant amount of the water that is used by people on a regular basis. Due to, in part, the ever-increasing demand for fresh water, it is critical that systems and methods are developed that allow groundwater usage to be effectively monitored.

In view of the foregoing, a need exists for methods and systems that provide quantitative measures of water usage that allow for determining significant deviations between the permitted discharge values and the actual discharge values, and consequently identify water over-discharges.

To address these needs, the methods and systems of the present invention utilize, for example, analytical and computational techniques along with sensor data to develop quantitative measures of water usage that allow for determining significant deviations between the permitted discharge values and the actual discharge values, and consequently identify water over-discharge.

With respect to the following description, "licensed discharge" may refer to a pumping rate (or the amount of groundwater used) approved by the license-issuing authority regulating the groundwater usage at a particular location (e.g., a local government). "Reference head" may refer to a height (or "head") of groundwater at a particular location in a region, or just outside the region, that provides the average groundwater level in that region. "Groundwater head" may refer to a height to which groundwater has risen, at a particular location, above a reference plane (e.g., the sea level). "Radius of influence" may refer to the distance from a particular location up to which groundwater flow is influenced by the groundwater at the particular location.

In some embodiments, the methods and systems use, for example, groundwater heads measured at multiple locations (e.g., observation wells) within a particular area (e.g., the radius of influence) to compute the groundwater discharge at various locations within the area. The computed groundwater discharge is then compared to the licensed discharge for the location. If the computed discharge exceeds the licensed discharge, an indication may be generated to alert a user that water over-discharge may be taking place (or has occurred).

For example, in some embodiments, a system is provided that enables a quantifiable way of determining if the groundwater usage (or discharge) at a particular location, or multiple locations, such as wells, is greater than the licensed value for a quasi-steady state aquifer. The system may store the discharge limit and the coordinates for wells in a given region through information from the license permits. Groundwater heads measured by sensors, either in a particular well of interest or nearby observation wells (or locations) within the radius of influence, may be recorded and used for analysis. The reference head for the region may also be recorded. The system may also record estimates of various characteristics of the region related to groundwater (or the particular aquifer(s)), such as hydraulic conductivity, transmissivity, aquifer depth, river flow rates, and permeabilities.

Using, for example, the recorded groundwater head(s), reference head, and various other characteristics of the region, the system computes (or calculates or determines or estimates) the groundwater discharge of at least one of the locations (or wells) and compares that value to the licensed value associated with that location(s). In some embodiments, the groundwater discharge is calculated using the groundwater flow equation, as is commonly understood in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, hand-held or laptop devices, and network PCs. However, in some embodiments, some of the components depicted in FIG. 1 may be located in a computing device in, or associated with, a groundwater sensor. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
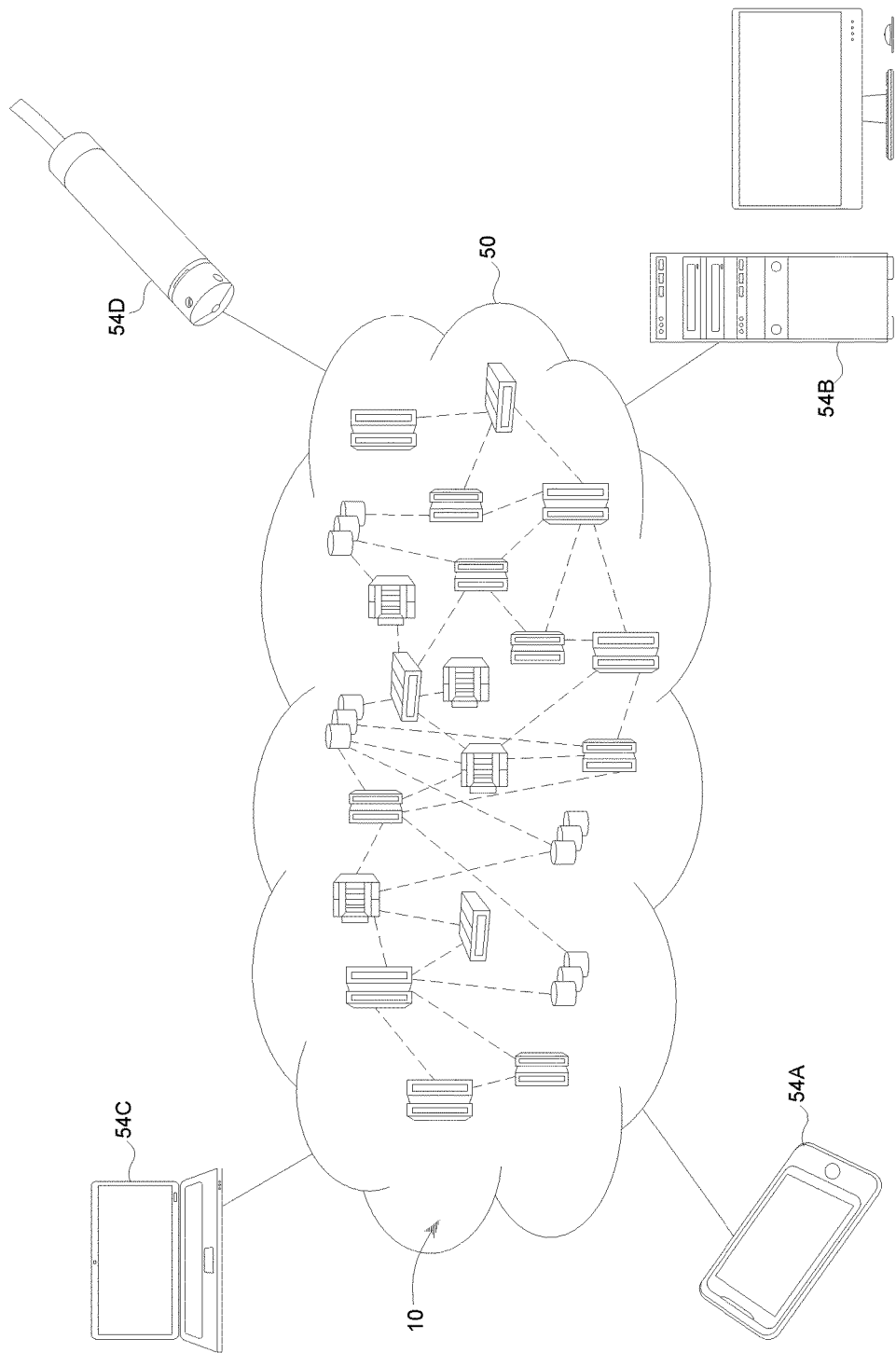
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, and/or laptop computer 54C, and others computer systems, such as, for example, those in, or associated with, groundwater sensors 54D, may communicate. The groundwater sensors 54D may include, for example, water level sensors, such as pressure transducers (e.g., piezometers), bubblers, shaft encoders, or ultrasonic sensors, and sensors suitable for measuring other characteristics related to groundwater, such as hydraulic conductivity, transmissivity, aquifer depth, river flow rates, and permeabilities.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-D shown in FIG. 2 are intended to be illustrative only and that computing nodes 10 and cloud computing environment 50 can communicate with any type of computerized device over any type of network and/or network addressable connection (e.g., using a web browser).

Figure 3:
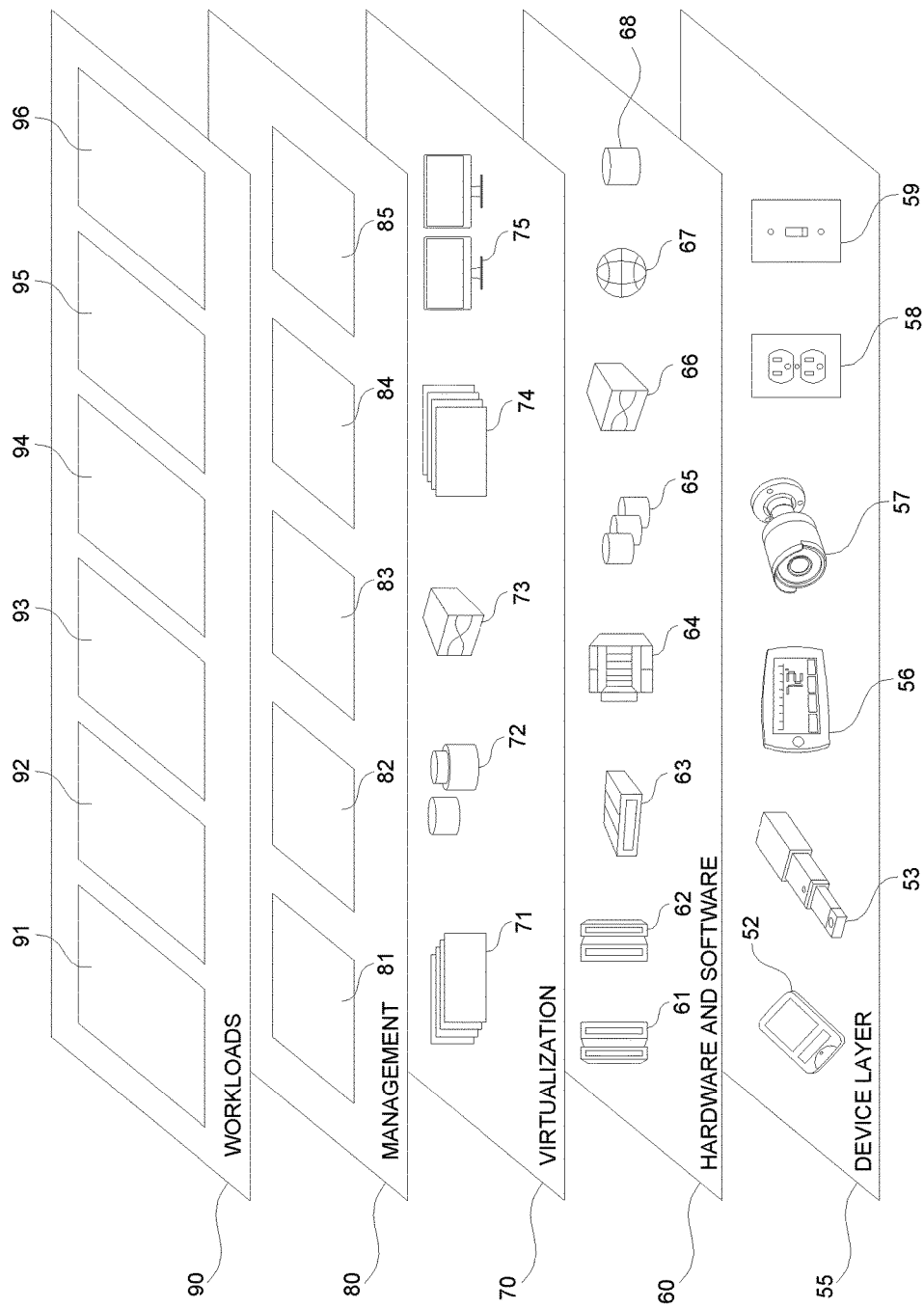
FIG. 3 is an additional block diagram depicting abstraction model layers according to an embodiment of the present invention.

Referring now to FIG. 3, a set of functional abstraction layers provided by cloud computing environment 50 (FIG.

2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various groundwater sensors, and various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for monitoring groundwater discharge as described herein. One of ordinary skill in the art will appreciate that the workloads and functions 96 for monitoring groundwater discharge may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the methods and systems of the illustrated embodiments provide novel approaches for monitoring groundwater discharge. In particular, in some embodiments, methods and systems for detecting groundwater over-discharge are provided. In at least some examples, a groundwater head is measured at each of at least some of a plurality of locations. A groundwater discharge is determined for at least one of the plurality of locations based on the measured groundwater heads. The determined groundwater discharge is compared to a groundwater discharge threshold associated with the at least one of the plurality of locations. An indication of the comparison of the determined groundwater discharge to the groundwater discharge threshold may then be generated. In some embodiments, the groundwater discharge is determined for at least one location that is not one of the locations at which the groundwater head is measured (i.e., the groundwater discharge at a location may be determined without measuring the groundwater head at that particular location).

The groundwater discharge may be determined using the groundwater flow equation, as is commonly understood. The locations at which the groundwater head is measured may be within a radius of influence of the location(s) for which the groundwater discharge is determined. Various other hydrogeologic characteristics, such as hydraulic conductivity, transmissivity, aquifer depth, river flow rates, and permeabilities, may also be taken into consideration in determining the groundwater discharge (e.g., taken into account using the groundwater flow equation).

Figure 4:
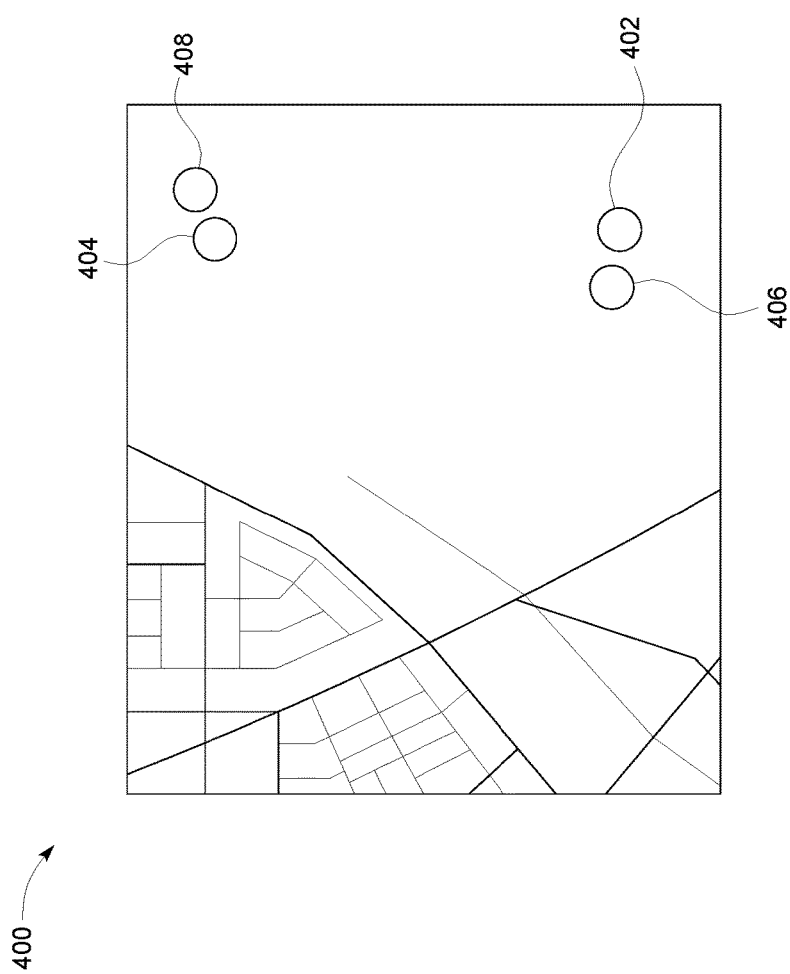
FIG. 4 is a plan view of a map of a region having several groundwater-related locations therein.

Referring to FIG. 4, a map 400 of an exemplary geographic region, having various roadways and/or boundaries, is shown. On the map, a first well location 402, a second well location 404, a first observation location 406, and a second observation location 408 are indicated. In some embodiments, the first and second well locations 402 and 404 refer to locations at which groundwater wells are located or groundwater is otherwise discharged from the ground. However, in at least some embodiments, the first and second well locations 402 and 404 do not include any equipment (or sensors) suitable for directly determining the groundwater head and/or groundwater discharge at those locations. The first and second observation locations 406 and 408 may refer to locations, regardless of the presence of a well, that (at least) include sensors suitable for determining the groundwater head at those locations and/or for determining the reference head for the region (e.g., the region shown on the map 400) overall.

In the particular embodiment shown in FIG. 4, the first observation location 406 is near the first well location 402, and the second observation location 408 is near the second well location 404. In some embodiments, all four locations 402-408 are within the radius of influence of each other (and/or of every portion of the region shown on the map 400).

The region shown on the map 400 may be considered to be covered by a grid (e.g., 1000×1000) of coordinates. Using such a set of coordinates, in the particular example shown in FIG. 4, the coordinates of the first well location 402 are (870, 150), and the coordinates of the second well location 404 are (870, 850). Similarly, the coordinates of the first and second observation locations may be (868.38, 153.63) and (876.37, 863.64), respectively.

In some embodiments, the methods and systems described herein retrieve and/or store the groundwater discharge limits (as determined by the appropriate authority) associated with the locations (e.g., coordinates) of the wells. In order to determine the groundwater discharge at various locations on the region, or more particularly, whether or not the groundwater discharge exceeds the discharge limit associated with those locations, various information about the region is first collected (and/or measurements are made). In some embodiments, the groundwater head at each of the observation locations 406 and 408 are measured. The groundwater head(s) may be measured using, for example, water level sensors, such as pressure transducers (e.g., piezometers), bubblers, shaft encoders, and/or ultrasonic sensors. Additionally, a reference head for the region (e.g., as determined at coordinates (1, 1)) and perhaps various other hydrogeologic characteristics (e.g., hydraulic transmissivity) are measured (and/or determined).

This information is then used to determine the groundwater discharge at various locations within the region, such as at the first well location 402 and the second well location 404 (e.g., locations at which the groundwater head was not measured). However, it should be understood that in at least some embodiments, the groundwater discharge for other locations within the region, such as the observation locations 406 and 408, is also determined.

Figure 5:
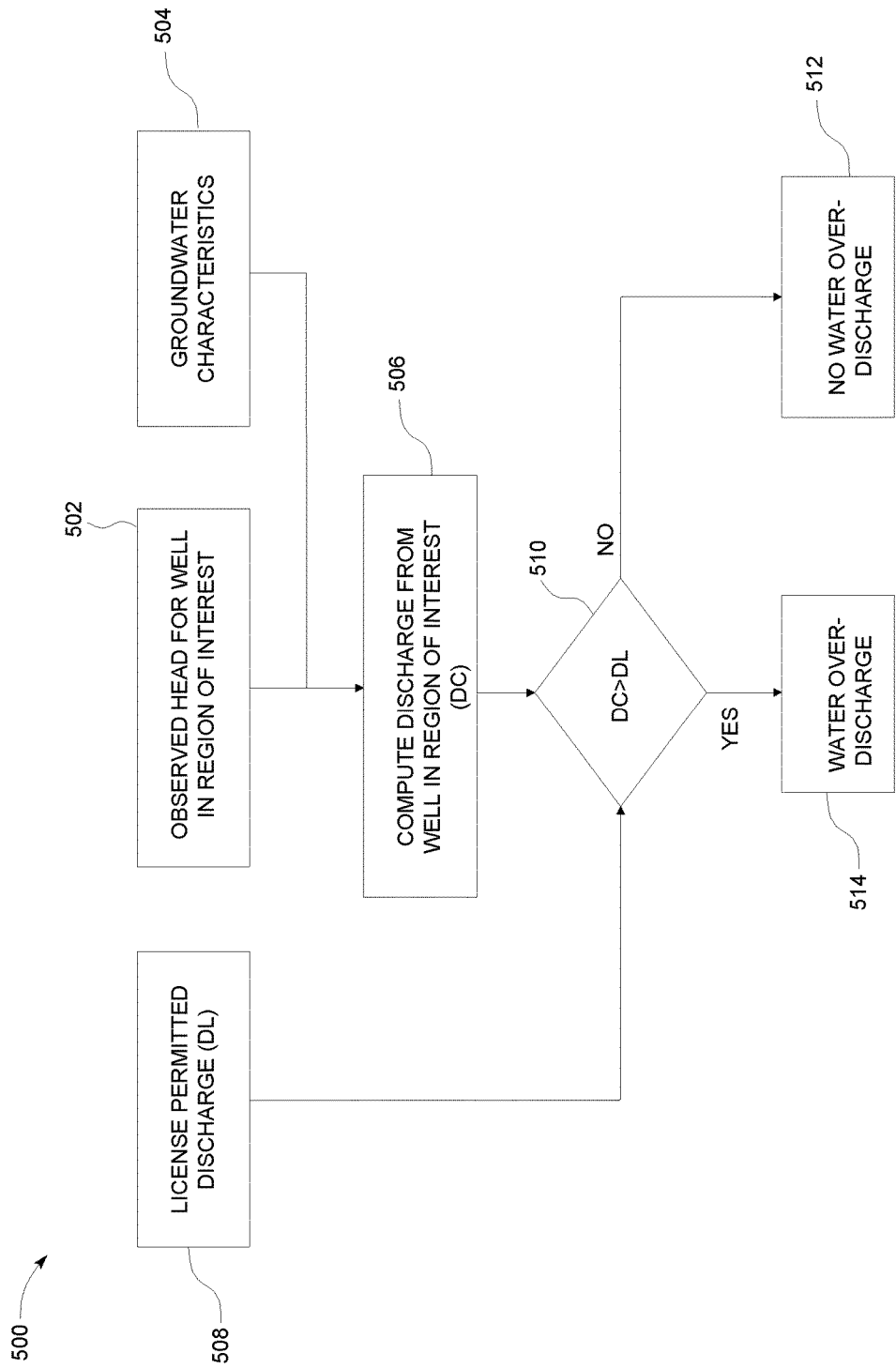
FIGS. 5-7 are block/flow diagrams illustrating certain aspects of functionality according to the present invention.

FIG. 5 is a simplified block/flow diagram illustrating certain aspects of functionality, or functional blocks 500, according to some embodiments of the present invention. As shown, an observed head (e.g., measured groundwater head(s)) 502 and groundwater characteristics 504 are used to compute the groundwater discharge from well(s) (or locations) in the region of interest at block 506, as described in greater detail below. The computed groundwater discharge from block 506 and the license permitted discharge (or discharge limit) 508 for the location(s) of interest are sent to block 510, where it is determined whether or not the computed groundwater discharge exceeds the discharge limit(s). If the computed discharge does not exceed the discharge limit, it is determined that no groundwater over-discharge is occurring (and/or has occurred) at block 512. If the computed discharge does exceed the discharge limit, it is determined that groundwater over-discharge is occurring (or has occurred) at block 514.

Although not shown in FIG. 5, an indication of whether or not groundwater over-discharge is occurring (e.g., block 512 or block 514) may be generated and provided to a user (e.g., an authority monitoring the groundwater discharge) in any suitable manner. For example, the indication may be provided by electronic messages (e.g., text message, email, etc.), visual messages (e.g., on display screens), and/or aural messages (e.g., recorded messages, buzzers, etc.).

In some embodiments, the groundwater discharge is determined (e.g., at block 506 in FIG. 5) using the groundwater flow equation. As will be appreciated by one skilled in the art, the groundwater flow equation is the mathematical relationship which is used to describe the flow of groundwater through an aquifer. The transient flow of groundwater may be described by a form of the diffusion equation, similar to that used in heat transfer to describe the flow of heat in a solid (i.e., heat conduction). The steady-state flow of groundwater is described by a form of the Laplace equation, which is a form of potential flow and has analogs in numerous fields. The groundwater flow equation is often derived for a small representative elemental volume (REV), where the properties of the medium are assumed to be effectively constant. A mass balance is done on the water flowing in and out of this small volume, the flux terms in the relationship being expressed in terms of head by using the constituitive equation called Darcy's law, which requires that the flow is slow.

Figure 6:
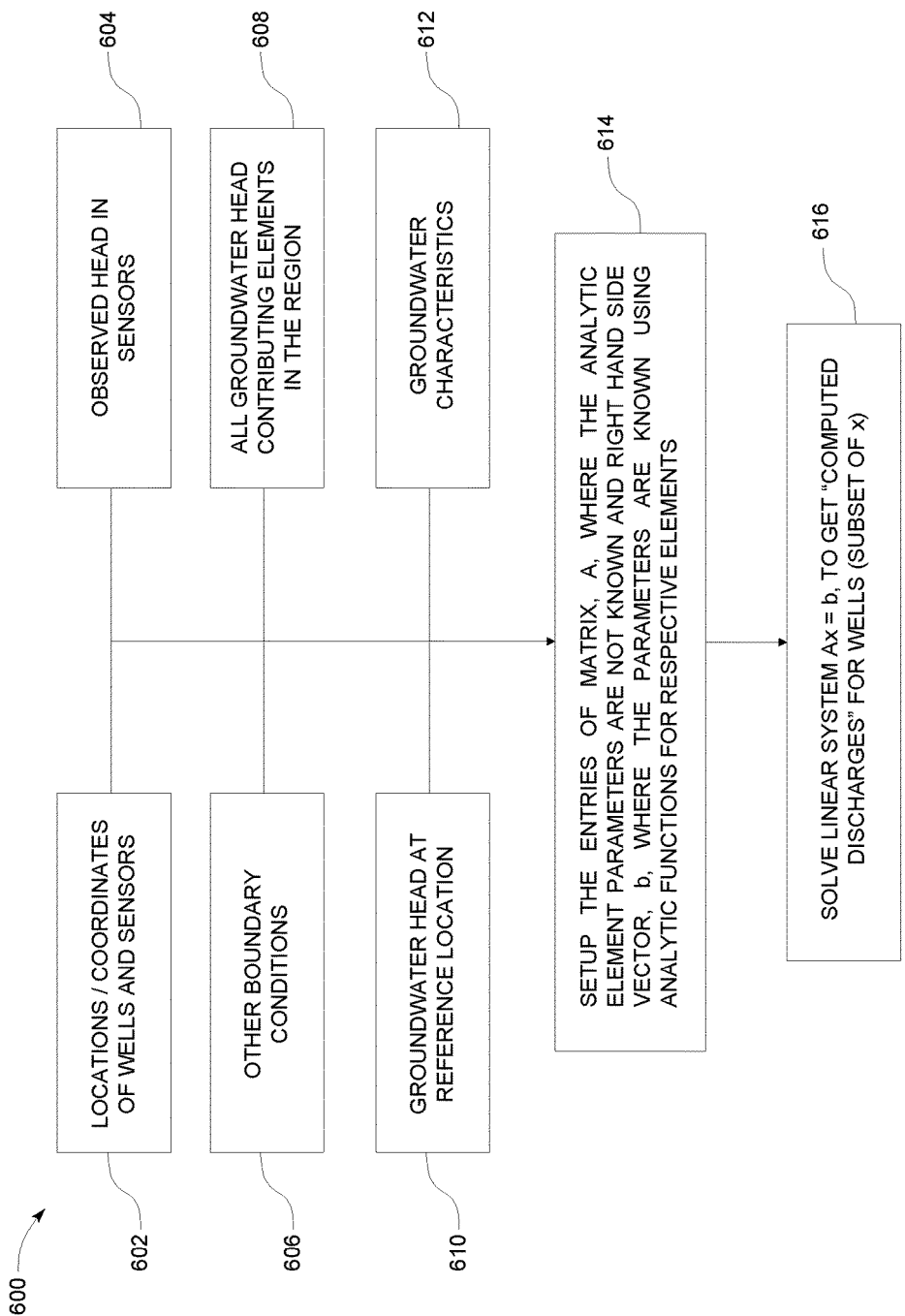

FIG. 6 is a simplified block/flow diagram illustrating additional aspects of functionality, or functional blocks, according to some embodiments of the present invention. In particular, FIG. 6 may be considered to illustrate a method 600 for determining groundwater discharge utilizing the groundwater flow equation, according to some embodiments of the present invention (e.g., blocks 502, 504, and 506 in FIG. 5). As shown, various types of information, including the locations/coordinates of wells and sensors 602, the observed heads (i.e., measured groundwater heads) 604, other boundary conditions 606, all groundwater head contributing elements within the region 608, the groundwater head at a reference location (e.g., the reference head) 610, and other groundwater characteristics 612 are sent to and/or used by blocks 614 and 616, which implement the groundwater flow equation.

In the particular example shown in FIG. 6, at block 614, as will be appreciated by one skilled in the art, the entries of a matrix (A) and right side vector (b) are setup. Within the matrix (A), the analytic element parameters are not known, and the parameters of the right side (b) are known using analytic functions for respective elements. At block 616, the linear system, Ax=b, is solved to determined the groundwater discharges for the wells/locations in the region, again, as will be appreciated by one skilled in the art.

Figure 7:
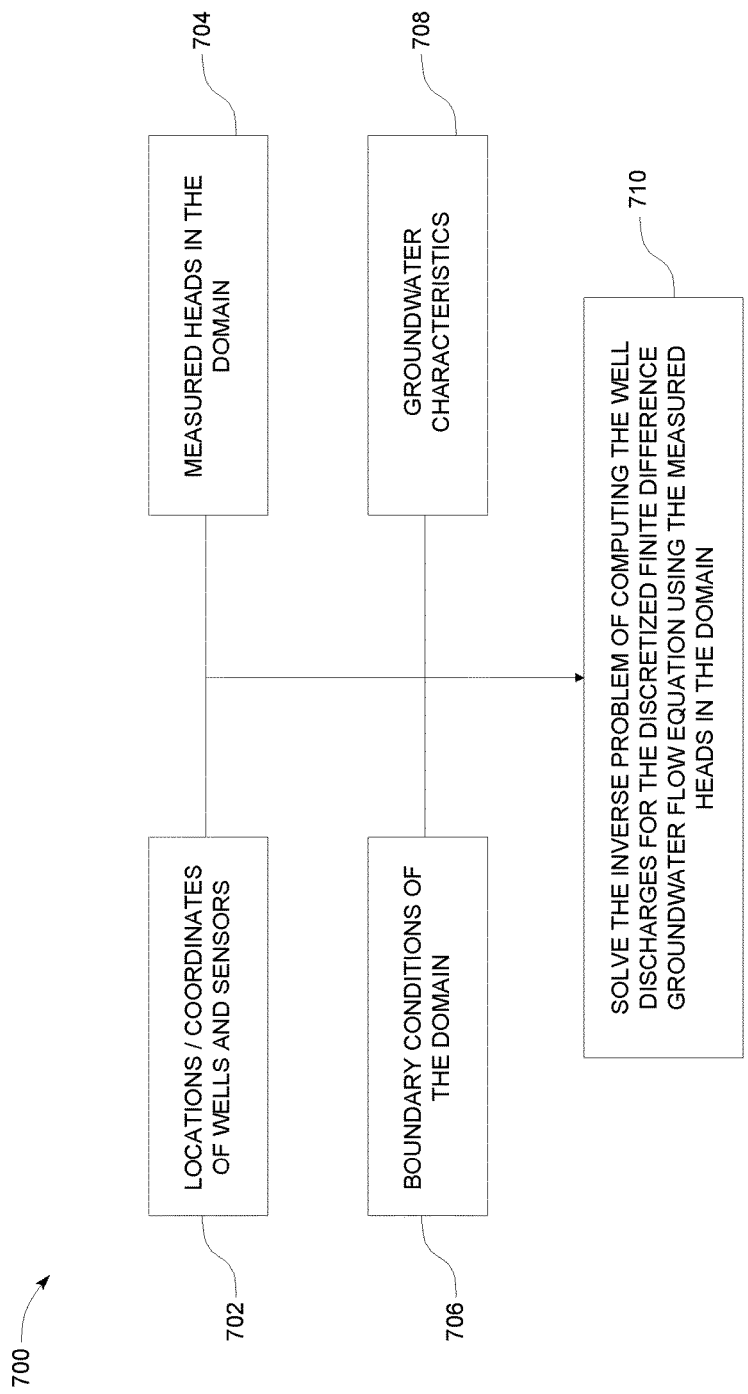

FIG. 7 is a simplified block/flow diagram illustrating additional aspects of functionality, or functional blocks, according to some embodiments of the present invention. In particular, FIG. 7 may be considered to illustrate a method 700, different than that shown in FIG. 6, for determining groundwater discharge utilizing the groundwater flow equation, according to some embodiments of the present invention (e.g., blocks 502, 504, and 506 in FIG. 5). As shown, various types of information, including the locations/coordinates of wells and sensors 702, the observed heads (i.e., measured groundwater heads) 704, boundary conditions of the domain (or region) 706, and groundwater characteristics 708 are sent to and/or used by block 710, which implements the groundwater flow equation.

In the particular example shown in FIG. 7, at block 710, as will be appreciated by one skilled in the art, the inverse problem of computing the groundwater discharge(s) for the discretized finite difference groundwater flow equation is solved using the measured groundwater heads in the domain (or region of interest).

It should be understood that the examples shown in FIGS. 6 and 7 are intended to represent mere examples of how the groundwater flow equation may be utilized by some embodiments of the present invention. One skilled in the art will recognize that multiple other methodologies and/or versions of the groundwater flow equation may be used.

Referring again to FIG. 4, as one specific example, the discharge limit (or threshold) of the first well location 402 is 1000 cubic meters per day (m³/day), and the discharge limit of the second well location 404 is 5000 m³/day. The reference head is 40 meters above sea level (m asl), and the hydraulic transmissivity is 125 square meters per day (m²/day).

In such an example, if the measured groundwater head at the first observation location 406 is 26.20 m asl, and the measured groundwater head at the second observation location 408 is 6.67 m asl, the result, determined using the groundwater flow equation as described above, is a computed groundwater discharge of 1000 m³/day at the first well location 402 and 5000 m³/day at the second well location 404. Such results would indicate that the groundwater discharge at neither the first well location 402 nor the second well location 404 exceeds the discharge limit associated with those locations.

However, still referring to FIG. 4, as another specific example, if the measured groundwater head at the first observation location 406 is 19.13 m asl, and the measured groundwater head at the second observation location 408 is 5.91 m asl, the result, determined using the groundwater flow equation as described above, is a computed groundwater discharge of 1900 m³/day at the first well location 402 and 5000 m³/day at the second well location 404. Such results would indicate that the groundwater discharge at the first well location 402 exceeds the discharge limit at that location, while the groundwater discharge at the second well location 404 does not exceed its associated discharge limit.

The methods and systems described above provide an objective methodology to check for water over-discharge. This may be achieved in such a manner that requires minimal, if any, additional hardware (e.g., sensors) to existing groundwater flow infrastructure, as either existing observation wells may be used for measurements or sensors can be placed near the wells, which are relatively inexpensive to install, and observation wells/sensors may be located away from the actual wells (but within the radius of influence of the well), and hence prevent any tampering.

Figure 8:
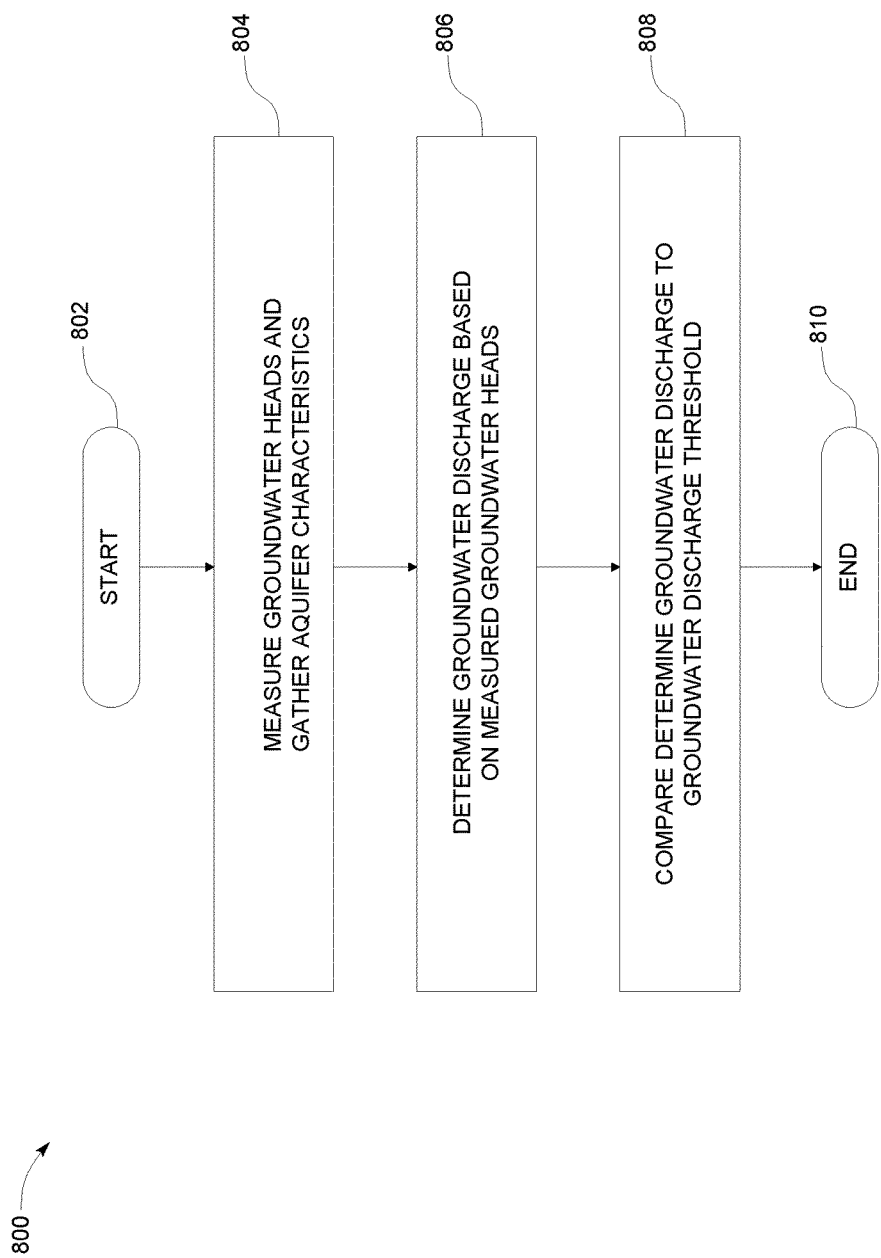
FIG. 8 is a flowchart diagram depicting an exemplary method for monitoring groundwater discharge in which various aspects of the present invention may be implemented.

Turning to FIG. 8, a flowchart diagram of an exemplary method 800 for monitoring groundwater discharge (and/or for detecting groundwater over-discharge), in accordance with various aspects of the present invention, is illustrated. Method 800 begins (step 802) with, for example, a region of interest, having one or more wells and/or groundwater observation locations, being selected.

Groundwater heads are measured (step 804) at some (or at least some) of the pertinent locations in the region (e.g., wells and/or groundwater observation locations), and in some embodiments, other characteristics of the locations (or aquifers) (e.g., hydrogeologic characteristics) are gathered. The groundwater head(s) may be measured using, for example, water level sensors, such as pressure transducers (e.g., piezometers), bubblers, shaft encoders, and/or ultrasonic sensors.

The groundwater discharge for at least some of the locations within the region is then determined (or computed or calculated) (step 806) using, for example, the groundwater flow equation. In addition to the measured groundwater heads, a reference head for the region may be used along with various other hydrogeologic characteristics of the region, such as hydraulic conductivity, transmissivity, aquifer depth, river flow rates, and/or permeabilities. In some embodiments, at least some of the locations for which the groundwater discharge is determined are locations at which the groundwater head was not measured (e.g., locations that are not equipped with water level sensors).

The determined groundwater discharge(s) is then compared to a groundwater discharge threshold (or discharge limit) associated with the respective location(s) (step 808). In some embodiments, if the determined discharge exceeds the discharge limit, a decision is made that groundwater over-discharge has occurred (and/or is occurring). Method 800 ends (step 810) with, for example, an indication of the comparison of the determined discharge to the discharge limit being generated (e.g., at least in instances when an over-discharge has been detected). The indication may be provided by, for example, an electronic message (e.g., text message, email, etc.), visual messages (e.g., on display screens), and/or aural messages (e.g., recorded messages, buzzers, etc.).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a one or more processors, for monitoring groundwater discharge, comprising:
   measuring a groundwater head at each of at least some of a plurality of locations;
   determining a groundwater discharge for at least one of the plurality of locations based on the measured groundwater heads;
   comparing the determined groundwater discharge to a groundwater discharge threshold associated with the at least one of the plurality of locations; and
   generating an indication of said comparison of the determined groundwater discharge to the groundwater discharge threshold; wherein generating the indication further comprises providing the indication to an electronic device via one of an electronic message, a visual message displayed on a display, and an aural message.

2. The method of claim 1, wherein the at least one of the plurality of locations for which the groundwater discharge is determined is not a location at which the groundwater head is measured.

3. The method of claim 1, wherein the determining of the groundwater discharge based on the measured groundwater heads is performed using a groundwater flow equation comprising a mathematical relationship describing a flow of groundwater through an aquifer.

4. The method of claim 3, wherein the at least some of the plurality of locations at which the groundwater heads are measured are within a radius of influence of the at least one of the plurality of locations for which the groundwater discharge is determined.

5. The method of claim 1, wherein the determining of the groundwater discharge is further based on at least one hydrogeologic characteristic associated with the plurality of locations.

6. The method of claim 5, wherein the at least one hydrogeologic characteristic includes at least one of hydraulic conductivity, transmissivity, or permeability.

7. A system for monitoring groundwater discharge, comprising:
   at least one processor that
      receives a measurement of a groundwater head at each of at least some of a plurality of locations;
      determines a groundwater discharge for at least one of the plurality of locations based on the measured groundwater heads;
      compares the determined groundwater discharge to a groundwater discharge threshold associated with the at least one of the plurality of locations; and
      generates an indication of said comparison of the determined groundwater discharge to the groundwater discharge threshold; wherein generating the indication further comprises providing the indication to an electronic device via one of an electronic message, a visual message displayed on a display, and an aural message.

8. The system of claim 7, wherein the at least one of the plurality of locations for which the groundwater discharge is determined is not a location at which the groundwater head is measured.

9. The system of claim 7, wherein the determining of the groundwater discharge based on the measured groundwater heads is performed using a groundwater flow equation comprising a mathematical relationship describing a flow of groundwater through an aquifer.

10. The system of claim 9, wherein the at least some of the plurality of locations at which the groundwater heads are measured are within a radius of influence of the at least one of the plurality of locations for which the groundwater discharge is determined.

11. The system of claim 7, wherein the determining of the groundwater discharge is further based on at least one hydrogeologic characteristic associated with the plurality of locations.

12. The system of claim 11, wherein the at least one hydrogeologic characteristic includes at least one of hydraulic conductivity, transmissivity, or permeability.

13. A computer program product for monitoring groundwater discharge by one or more processors, the computer program product comprising a non-transitory computer-readable storage medium having computer-readable program code portions stored therein, the computer-readable program code portions comprising:
   an executable portion that receives a measurement of a groundwater head at each of at least some of a plurality of locations;
   an executable portion that determines a groundwater discharge for at least one of the plurality of locations based on the measured groundwater heads;
   an executable portion that compares the determined groundwater discharge to a groundwater discharge threshold associated with the at least one of the plurality of locations; and
   an executable portion that generates an indication of said comparison of the determined groundwater discharge to the groundwater discharge threshold; wherein generating the indication further comprises providing the indication to an electronic device via one of an electronic message, a visual message displayed on a display, and an aural message.

14. The computer program product of claim 13, wherein the at least one of the plurality of locations for which the groundwater discharge is determined is not a location at which the groundwater head is measured.

15. The computer program product of claim 13, wherein the determining of the groundwater discharge based on the measured groundwater heads is performed using a groundwater flow equation comprising a mathematical relationship describing a flow of groundwater through an aquifer.

16. The computer program product of claim 15, wherein the at least some of the plurality of locations at which the groundwater heads are measured are within a radius of influence of the at least one of the plurality of locations for which the groundwater discharge is determined.

17. The computer program product of claim 13, wherein the determining of the groundwater discharge is further based on at least one hydrogeologic characteristic associated with the plurality of locations.

18. The computer program product of claim 17, wherein the at least one hydrogeologic characteristic includes at least one of hydraulic conductivity, transmissivity, or permeability.

* * * * *